US007734615B2

(12) United States Patent
Anderson et al.

(10) Patent No.: US 7,734,615 B2
(45) Date of Patent: Jun. 8, 2010

(54) PERFORMANCE DATA FOR QUERY OPTIMIZATION OF DATABASE PARTITIONS

(75) Inventors: Mark John Anderson, Oronoco, MN (US); Robert Joseph Bestgen, Dodge Center, MN (US); Shantan Kethireddy, Rochester, MN (US); Jeffrey Wayne Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/138,832

(22) Filed: May 26, 2005

(65) Prior Publication Data

US 2006/0271504 A1 Nov. 30, 2006

(51) Int. Cl.
  *G06F 17/30* (2006.01)
(52) U.S. Cl. ..................................... 707/713
(58) Field of Classification Search .................. 707/1–5
  See application file for complete search history.

(56) References Cited

U.S. PATENT DOCUMENTS

| | | | | |
|---|---|---|---|---|
| 5,404,510 | A * | 4/1995 | Smith et al. ..................... | 707/2 |
| 5,590,319 | A * | 12/1996 | Cohen et al. .................... | 707/4 |
| 5,668,987 | A * | 9/1997 | Schneider ....................... | 707/3 |
| 5,819,255 | A * | 10/1998 | Celis et al. ...................... | 707/2 |
| 5,822,747 | A * | 10/1998 | Graefe et al. ................... | 707/2 |
| 5,924,094 | A * | 7/1999 | Sutter ........................... | 707/10 |
| 5,974,457 | A * | 10/1999 | Waclawsky et al. .......... | 709/224 |
| 6,021,405 | A * | 2/2000 | Celis et al. ...................... | 707/2 |
| 6,026,391 | A | 2/2000 | Osborn et al. | |
| 6,032,143 | A * | 2/2000 | Leung et al. .................... | 707/2 |
| 6,092,062 | A * | 7/2000 | Lohman et al. ................. | 707/2 |
| 6,112,198 | A * | 8/2000 | Lohman et al. ................. | 707/3 |
| 6,223,171 | B1 | 4/2001 | Chaudhuri et al. | |
| 6,275,818 | B1 | 8/2001 | Subramanian et al. | |
| 6,339,769 | B1 | 1/2002 | Cochrane et al. | |
| 6,470,335 | B1 * | 10/2002 | Marusak ........................ | 707/4 |
| 6,564,212 | B2 * | 5/2003 | Koskas .......................... | 707/3 |

(Continued)

OTHER PUBLICATIONS

"Using the Design Advisor to migrate from a single-partition to a multiple-partition database," http://publib.boulder.ibm.com/infocenter/db2help/topic/com.ibm.db2.udb.doc/admin/t0011.

(Continued)

*Primary Examiner*—John R. Cottingham
*Assistant Examiner*—Mohammed R Uddin
(74) *Attorney, Agent, or Firm*—Owen J. Gamon

(57) ABSTRACT

A method, apparatus, system, and signal-bearing medium that, in an embodiment, determine performance data for query optimization of a query directed to a database table having multiple partitions. The performance data for the query optimization is presented in a user interface, and an option is provided in the user interface to create a non-spanning index for any of the partitions mentioned in the performance data. In various embodiments, determining the performance data may include: determining the partitions that were unexpanded by the query optimization, determining the partitions that had a runtime estimate that was different from an actual query runtime by a threshold, determining whether any of the partitions had expansion forced by a client request, determining whether the query performed partition elimination, determining whether any of the partitions has an associated index that is unused by the query and that also has a key that is not present in all of the partitions, and determining a constraint for partition elimination.

11 Claims, 8 Drawing Sheets

U.S. PATENT DOCUMENTS

| | | | |
|---|---|---|---|
| 6,567,802 B1* | 5/2003 | Popa et al. ................... | 707/3 |
| 6,581,055 B1 | 6/2003 | Ziauddin et al. | |
| 6,609,123 B1* | 8/2003 | Cazemier et al. ............. | 707/4 |
| 6,618,719 B1* | 9/2003 | Andrei ........................ | 707/2 |
| 6,643,640 B1* | 11/2003 | Getchius et al. ............. | 707/3 |
| 6,691,101 B2* | 2/2004 | MacNicol et al. ........... | 707/2 |
| 6,763,359 B2 | 7/2004 | Lohman et al. | |
| 6,785,673 B1 | 8/2004 | Fernandez et al. | |
| 6,816,874 B1* | 11/2004 | Cotner et al. ............... | 707/204 |
| 6,931,401 B2* | 8/2005 | Gibson et al. ............... | 707/6 |
| 6,957,225 B1 | 10/2005 | Zait et al. | |
| 7,020,661 B1 | 3/2006 | Cruanes et al. | |
| 7,076,508 B2* | 7/2006 | Bourbonnais et al. ....... | 707/202 |
| 7,130,838 B2* | 10/2006 | Barsness et al. ............. | 707/2 |
| 7,139,749 B2 | 11/2006 | Bossman et al. | |
| 7,149,716 B2 | 12/2006 | Gatto | |
| 7,171,399 B2* | 1/2007 | Kapoor et al. .............. | 707/2 |
| 7,177,855 B2* | 2/2007 | Witkowski et al. ........... | 707/2 |
| 7,181,450 B2* | 2/2007 | Malloy et al. ............... | 707/4 |
| 7,395,537 B1 | 7/2008 | Brown et al. | |
| 2002/0035559 A1* | 3/2002 | Crowe et al. ................. | 707/2 |
| 2002/0049687 A1 | 4/2002 | Helsper et al. | |
| 2002/0103793 A1* | 8/2002 | Koller et al. ................. | 707/3 |
| 2003/0084030 A1 | 5/2003 | Day et al. | |
| 2004/0122845 A1* | 6/2004 | Lohman et al. ............. | 707/102 |
| 2004/0249810 A1 | 12/2004 | Das et al. | |
| 2005/0038784 A1 | 2/2005 | Zait et al. | |
| 2005/0160102 A1 | 7/2005 | Abdo et al. | |
| 2005/0192937 A1* | 9/2005 | Barsness et al. ............. | 707/3 |
| 2005/0210010 A1 | 9/2005 | Larson et al. | |
| 2006/0080285 A1* | 4/2006 | Chowdhuri ................... | 707/3 |
| 2006/0101001 A1* | 5/2006 | Lindsay et al. .............. | 707/3 |
| 2006/0155679 A1 | 7/2006 | Kothuri et al. | |
| 2006/0173852 A1* | 8/2006 | Bestgen et al. ............... | 707/10 |
| 2006/0271504 A1* | 11/2006 | Anderson et al. ............ | 707/2 |
| 2007/0016432 A1* | 1/2007 | Piggott et al. ................ | 705/1 |
| 2007/0016558 A1 | 1/2007 | Bestgen et al. | |
| 2007/0027860 A1 | 2/2007 | Bestgen et al. | |
| 2007/0061487 A1* | 3/2007 | Moore et al. ................ | 709/246 |
| 2007/0124276 A1* | 5/2007 | Weissman et al. ............. | 707/2 |
| 2007/0226176 A1* | 9/2007 | Bestgen et al. ............... | 707/2 |
| 2008/0033914 A1* | 2/2008 | Cherniack et al. ............ | 707/3 |

OTHER PUBLICATIONS

Patent U.S. Appl. No. 11/047,533 entitled "Apparatus and Method for Highlighting Discrepancies Between Query Performance Estimates and Actual Query Performance," filed Jan. 31, 2005 by Robert Bestgen et al.

D. Chatziantoniou et al., "Groupwise Processing of Relational Queries", Proceedings of the 23rd VLDB Conference (1997).

A. Shatdal et al., "Adaptive Parallel Aggregation Algorithms", Proceedings of the 1995 ACM-SIGMOD Conference (May 1995).

R. Niemiec, "Oracle9i Introduces List Partitioning", (Oracle Magazine Jul./Aug. 2002).

"Getting to Know Oracle 8i", Chapter 2: Oracle8i New Features (Oracle Corp. 1999).

"Event 10128: debug partition elimination", published at www.oracleadvice.com/Tips/partprune.htm (publication date unknown).

Stocker, et al "Integrating Semi-Join-reducers into State-of-the-Art Query Processors", IEEE Computer Society, 2001.

* cited by examiner

| 315 | 320 | 325 | 330 | 335 | 340 | 345 |
|---|---|---|---|---|---|---|
| QUERY | UNEXPAND PART | EST INACC | FULL EXPANSION FORCED | PART ELIM | NON-SPAN INDEX | CONST |
| QUERY A | P1 | P3 | NO | NO | P5 | > 18, <=25 |
| QUERY B | P2 | P4 | YES | YES | P6 | >10 |

305 ↗ (QUERY A row)
310 ↗ (QUERY B row)

PERFORMANCE DATA

PERFORMANCE DATA FOR QUERY OPTIMIZATION OF DATABASE PARTITIONS

FIELD

This invention generally relates to computer database management systems and more specifically relates to presenting performance data related to optimization of queries directed to databases that are partitioned.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a database management system (DBMS), which may also be called a database system or simply a database.

Many different types of databases are known, but the most common is usually called a relational database (RDB), which organizes data in tables that have rows, which represent individual entries or records in the database, and columns, which define what is stored in each entry or record. Each table has a unique name within the database and each column has a unique name within the particular table. The database also has an index, which is a data structure that informs the database management system of the location of a certain row in a table given an indexed column value, analogous to a book index informing the reader on which page a given word appears.

To be useful, the data stored in databases must be capable of being retrieved in an efficient manner. The most common way to retrieve data from a database is through statements called database queries, which may originate from user interfaces, application programs, or remote systems, such as clients or peers. A query is an expression evaluated by the database management system. As one might imagine, queries range from being very simple to very complex. Although the query requires the return of a particular data set in response, the method of query execution is typically not specified by the query. Thus, after the database management system receives a query, the database management system interprets the query and determines what internal steps are necessary to satisfy the query. These internal steps may include an identification of the table or tables specified in the query, the row or rows selected in the query, and other information such as whether to use an existing index, whether to build a temporary index, whether to use a temporary file to execute a sort, and/or the order in which the tables are to be joined together to satisfy the query.

When taken together, these internal steps are referred to as an execution plan. The execution plan is typically created by a software component of the database management system that is often called a query optimizer. The query optimizer may be part of the database management system or separate from, but in communication with, the database management system. When a query optimizer creates an execution plan for a given query, the execution plan is often saved by the database management system in the program object, e.g., the application program, that requested the query. The execution plan may also be saved in an SQL (Structured Query Language) package or an execution plan cache. Then, when the user or program object repeats the query, which is a common occurrence, the database management system can find and reutilize the associated saved execution plan instead of undergoing the expensive and time-consuming process of recreating the execution plan. Thus, reusing execution plans increases the performance of queries when performed by the database management system.

Many different execution plans may be created for any one query, each of which returns the required data set, yet the different execution plans may provide widely different performance. Thus, especially for large databases, the execution plan selected by the database management system needs to provide the required data at a reasonable cost in terms of time and hardware resources. Hence, the query optimizer often creates multiple prospective execution plans and then chooses the best, or least expensive one, to execute.

One factor that contributes to the cost of executing a particular execution plan is the way in which the database table or tables to which the query is directed are partitioned. Partitioning allows for table data to be stored using more than one physical data space, but the table appears as one object for data manipulation operations, such as queries, inserts, updates, and deletes. Partitioning can significantly improve performance if it is done properly, but partitioning also has the potential to decrease performance if done improperly. Partitioning has two fundamental types: horizontal and vertical. Horizontal partitioning allows tables to be partitioned into disjoint sets of rows, which are physically stored and accessed separately in different data spaces. In contrast, vertical partitioning allows a table to be partitioned into disjoint sets of columns, which are physically stored and accessed separately in different data spaces.

Because partitioning is so important to query performance, in either a positive or a negative way, users would like to have information that would aid them in making decisions about how to partition their tables, so that they make take appropriate action to tune performance. But, no current tools provide user with partition performance information, so users are frustrated in their efforts to performance tune their queries that use partitioned database tables.

SUMMARY

A method, apparatus, system, and signal-bearing medium are provided that, in an embodiment, determine performance data for query optimization of a query directed to a database table having multiple partitions. The performance data for the query optimization is presented in a user interface, and an option is provided in the user interface to create a non-spanning index for any of the partitions mentioned in the performance data. In various embodiments, determining the performance data may include: determining the partitions that were unexpanded by the query optimization, determining the partitions that had a runtime estimate that was different from an actual query runtime by a threshold, determining whether any of the partitions had expansion forced by a client request, determining whether the query performed partition elimination, determining whether any of the partitions has an associated index that is unused by the query and that also has a key that is not present in all of the partitions, and determining a constraint for partition elimination.

BRIEF DESCRIPTION OF THE DRAWINGS

Various embodiments of the present invention are hereinafter described in conjunction with the appended drawings:

FIG. 3A depicts a block diagram of example performance data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
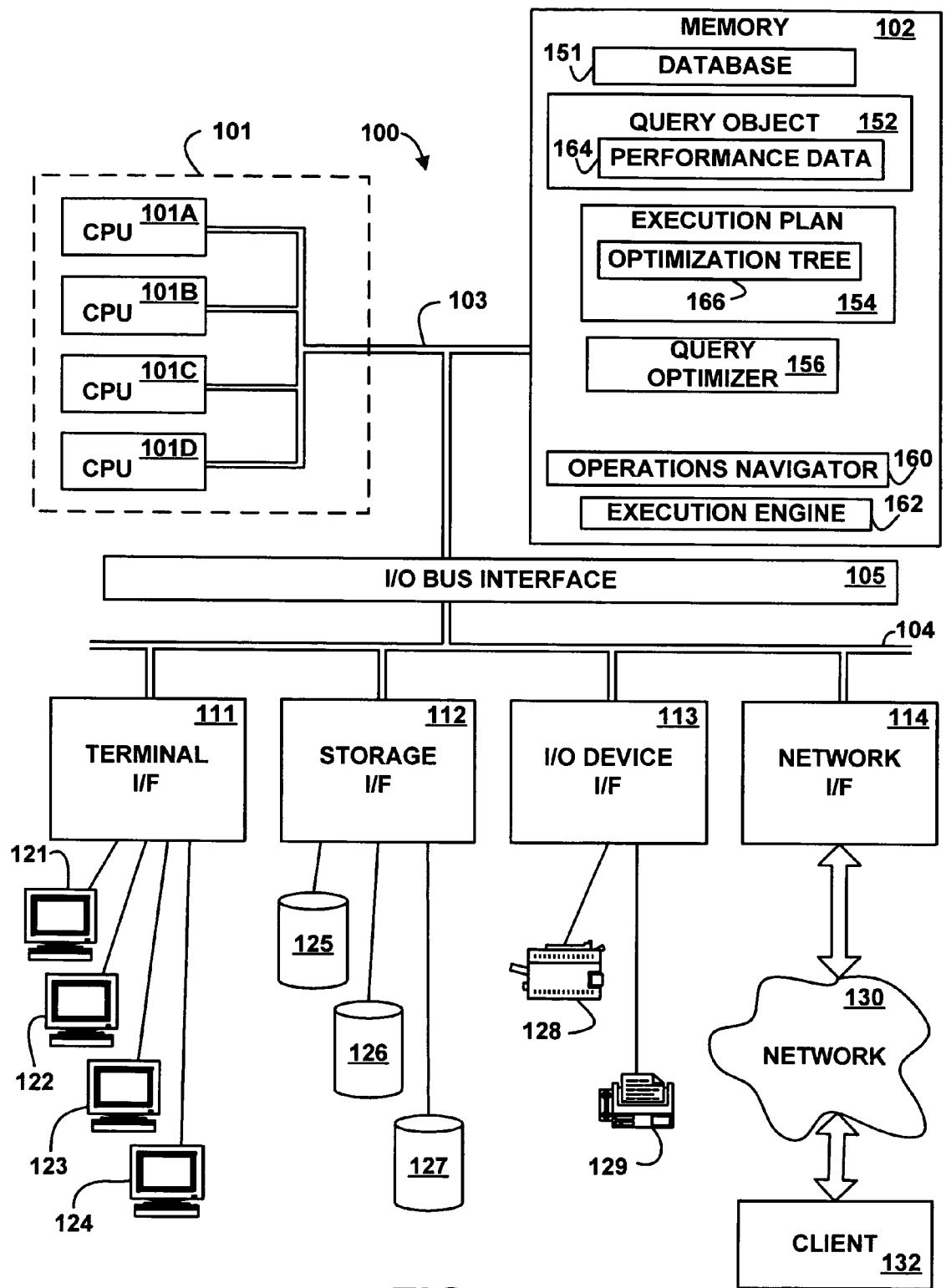
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a client 132, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system. The computer system 100 acts as a server for the client 132, but the terms "server" and "client" are used for convenience only, and in other embodiments an electronic device that is used as a server in one scenario may be used as a client in another scenario, and vice versa.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a database 151, a query object 152, an execution plan 154, a query optimizer 156, an operations navigator 160, and an execution engine 162. Although the database 151, the query object 152, the execution plan 154, the query optimizer 156, the operations navigator 160, and the execution engine 162 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database 151, the query object 152, the execution plan 154, the query optimizer 156, the operations navigator 160, and the execution engine 162 are illustrated as being contained within the main memory 102, these elements are not necessarily all completely contained in the same storage device at the same time. Further, although the database 151, the query object 152, the execution plan 154, the query optimizer 156, the operations navigator 160, and the execution engine 162 are illustrated as being separate entities, in other embodiments some of them, or portions of some of them, may be packaged together.

The client 132 sends a query statement to the query optimizer 156 or the operations navigator 160, which requests data from the database 151. The database 151 includes data, e.g., organized in rows and columns, and may also include indexes used to access the data. In an embodiment, a query statement includes a combination of SQL (Structured Query Language) commands intended to produce one or more output data tables according to a specification included in the query, but in other embodiments any appropriate query language may be used. The query statement expresses what the client 132 wants but does not express how to perform the query. Using the example of database that contains employee salary information, via an example query statement, the client 132 may request the database 151 to retrieve data for all employees having a salary between $10 and $12 per hour, but in other embodiments any appropriate type of data and query may be used.

The query optimizer 156 decides the best, the least expensive, or most efficient way to determine the results of the query. For example, the query optimizer 156 determines whether to read completely the table of employees, or whether using an index would be faster. To make this determination, the query optimizer 156 may generate multiple possible execution plans and choose the best one. In doing so, the query optimizer 156 may compare the costs of competing execution plans, and the costs may include estimated resource requirements determined in terms of time and space. More specifically, the resource requirements may include system information, such as the location of tables and parts of tables in the database 151, the size of such tables, network node locations, system operating characteristics and statistics, estimated runtime for the query, memory usage, and the estimated number of rows returned by the query, among others. The query optimizer 156 further creates the performance data 164 (further described below with reference to FIG. 3A) in the query object 152 based on the execution plan 154.

The execution plan 154 is composed of primitive operations, which are low-level information indicating the steps that the execution engine 162 is to take to execute the query statement against the database 151. Examples of primitive operations include reading a table completely, using an index, performing a nested loop or a hash join, among others. The execution plan 154 may further include, in various embodiments, an identification of the table or tables in the database 151 specified in the query, the row or rows selected in the query, and other information such as whether to use an existing index, whether to build a temporary index, whether to use a temporary file to execute a sort, and/or the order in which the tables are to be joined together to satisfy the query.

All primitive operations have an output: their result set. Some primitive operations, e.g., the nested loop, have one input. Other primitive operations, e.g., the hash join, have two inputs. Each input is connected to the output of another primitive operation, which allows the execution plan 154 to be represented as an optimization tree 166, where information flows from the leaves of the optimization tree 166 to the root of the optimization tree 166. The optimization tree 166 is further described below with reference to FIGS. 2A, 2B, and 2C. The execution engine 162 executes the query against the database 151 using the execution plan 154.

In an embodiment, the query optimizer 156, the operations navigator 160, and the execution engine 162 include instructions capable of executing on the processor 101 or statements capable of being interpreted by instructions executing on the processor 101 to perform the functions as further described below with reference to FIGS. 4, 5, 6, and 7. In another embodiment, the query optimizer 156, the operations navigator 160, and/or the execution engine 162 may be implemented in microcode. In another embodiment, the query optimizer 156, the operations navigator 160, and/or the execution engine 162 may be implemented in hardware via logic gates and/or other appropriate hardware techniques in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored on and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiments many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 may include some or all of the hardware components already described for the computer system 100. In another embodiment, the functions of the client 132 may be implemented as an application in the computer system 100.

It should be understood that FIG. 1 is intended to depict the representative major components of the computer system 100, the network 130, and the client 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be stored in, encoded on, and delivered to the computer system 100 via a variety of tangible signal-bearing media, which include, but are not limited to the following computer-readable media:

(1) information permanently stored on a non-rewriteable storage medium, e.g., a read-only memory or storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmission medium, such as through a computer or a telephone network, e.g., the network 130.

Such tangible signal-bearing media, when carrying or encoded with computer-readable, processor-readable, or machine-readable instructions or statements that direct or control the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
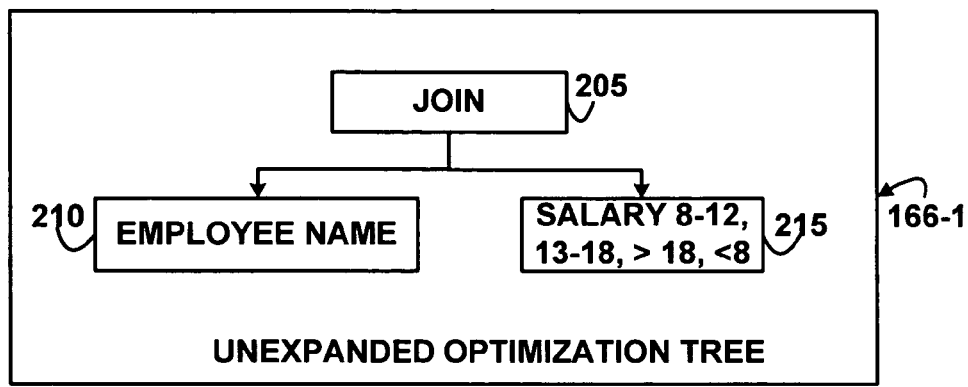
FIG. 2A depicts a block diagram of an unexpanded optimization tree, according to an embodiment of the invention.

FIG. 2A depicts a block diagram of an unexpanded optimization tree 166-1, according to an embodiment of the invention. The unexpanded optimization tree 166-1 is an example of the optimization tree 166 (FIG. 1). The unexpanded optimization tree 166-1 represents a join operation of two tables in the database 151, which in this example are an employee name table and a salary table. The unexpanded optimization tree 166-1 includes a node 205 representing the join operation, a node 210 representing the employee name table in the database 151, and a node 215 representing the salary table in the database 151. A join operation is a relationship between two tables accessed by a query. In response to a query requesting data from multiple tables, for example the employee name table and the salary table, the multiple tables are joined in order to find and retrieve the data from both the tables.

The optimization tree 166-1 is said to be unexpanded because the multiple partitions of the salary table 215 are not represented in the unexpanded optimization tree 166-1. Since, in the example of FIG. 2A, the salary table represented by the node 215 has multiple partitions, which are unexpanded, the query optimizer 156 dynamically optimizes the unexpanded partitions of the salary table 215 together.

The multiple partitions for the salary table are, in this example, a partition containing records for employees whose salary is between $8 and $12 an hour, a partition containing records for employees whose salary is between $13 and $18 an hour, a partition containing records for employees whose salary is greater than $18 an hour, and a partition containing records for employees whose salary is less than $8 an hour. But, in other embodiments any type of table with any appropriate data and any appropriate type of operation may be present.

Figure 2B:
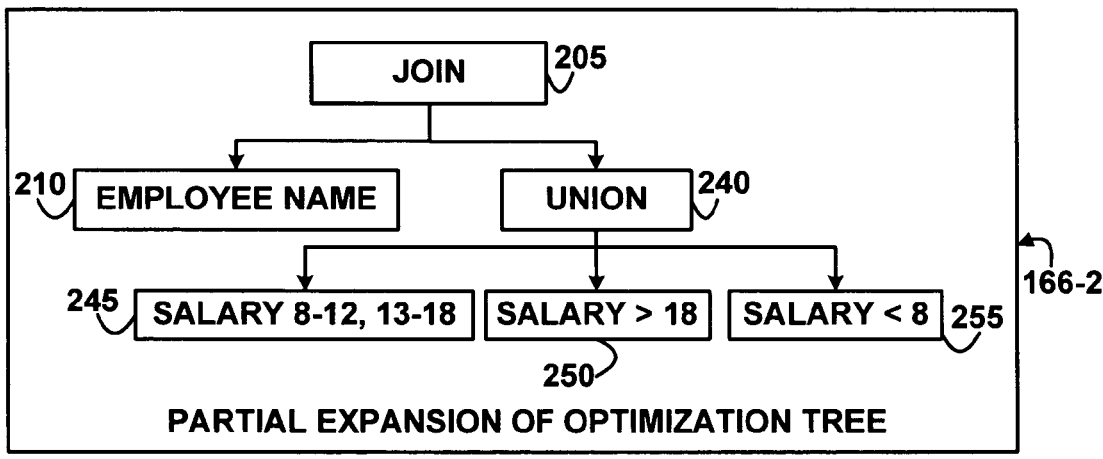
FIG. 2B depicts a block diagram of a partial expansion of an optimization tree, according to an embodiment of the invention.

FIG. 2B depicts a block diagram of a partially-expanded optimization tree 166-2, according to an embodiment of the invention. The partially-expanded optimization tree 166-2 is an example of the optimization tree 166 (FIG. 1). The partially-expanded optimization tree 166-2 represents a join operation (node 205) of two tables in the database 151, which in this example are an employee name table (node 210) and a salary table, where the salary table has multiple partitions. The multiple partitions of the salary table are partially expanded, as represented by the nodes 245, 250, and 255, against which a union operation (represented by the node 240) is performed. The optimization tree 166-2 is said to be partially expanded because the node 245 represents two partitions of the salary table: a partition containing records for employees whose salary is between $8 and $12 an hour, and a partition containing records for employees whose salary is between $13 and $18 an hour. The node 250 represents a partition containing records for employees whose salary is greater than $18 an hour. The node 255 represents a partition containing records for employees whose salary is less than $8 an hour. But, in other embodiments any type of table with any appropriate data, any appropriate type of operations, and any appropriate amount or type of partitioning may be present.

Since, in the example of FIG. 2B, the salary table has multiple partitions, some of which are expanded (the node 250 and the node 255) and some of which are unexpanded (the node 245), the query optimizer 156 dynamically optimizes the unexpanded partitions of the salary table 215 together and optimizes the expanded partitions separately.

Figure 2C:
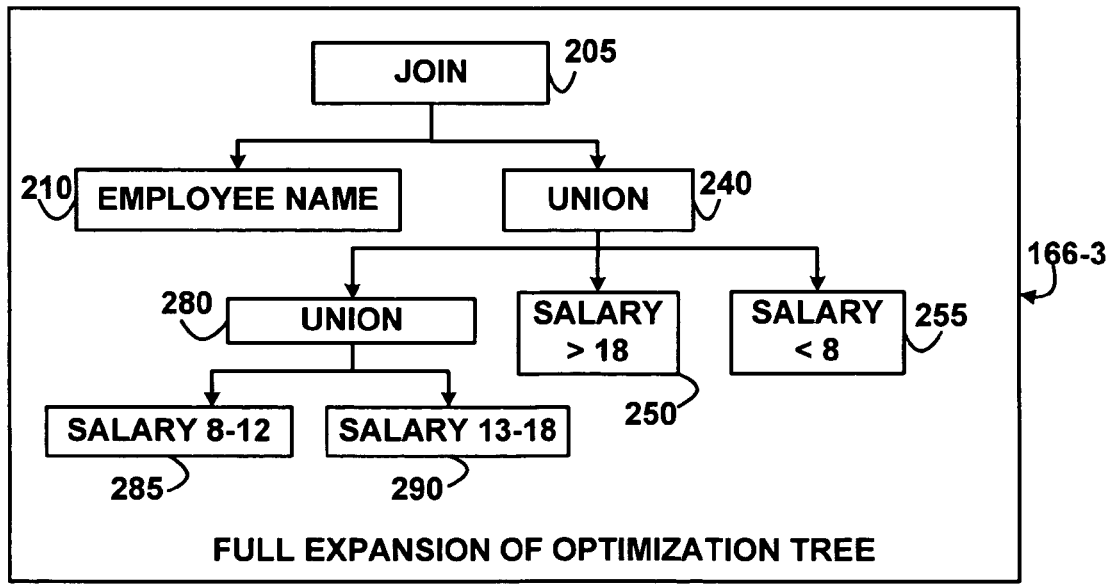
FIG. 2C depicts a block diagram of a full expansion of an optimization tree, according to an embodiment of the invention.

FIG. 2C depicts a block diagram of a fully-expanded optimization tree 166-3, according to an embodiment of the invention. The fully-expanded optimization tree 166-3 is an example of the optimization tree 166 (FIG. 1). The fully-expanded optimization tree 166-3 represents a join operation (node 205) of two tables in the database 151, which in this example are an employee name table (node 210) and a salary table, where the salary table has multiple partitions. The multiple partitions of the salary table are fully expanded, as represented by the nodes 285, 290, 250, and 255 against which union operations (represented by the nodes 240 and 280) are performed. The optimization tree 166-3 is said to be fully expanded because the nodes 285, 290, 250, and 255 represent all of the partitions of the salary table: a partition containing records for employees whose salary is between $8 and $12 an hour (node 285), a partition containing records for employees whose salary is between $13 and $18 an hour (node 290), a partition containing records for employees whose salary is greater than $18 an hour (node 250), and a partition containing records for employees whose salary is less than $8 an hour (node 255).

Since, in the example of FIG. 2C, the salary table has multiple partitions, all of which are expanded (represented by the nodes 285, 290, 250, and 255), the query optimizer 156 dynamically optimizes all of the expanded partitions separately.

FIG. 3A depicts a block diagram of example performance data 164, according to an embodiment of the invention. The example performance data 164 includes records 305 and 310, but in other embodiments any number of records with any appropriate data may be present. Each of the records 305 and 310 includes a query name field 315, an unexpanded partition field 320, an estimate inaccurate field 325, a full expansion forced field 330, a partition elimination field 335, a non-spanning index field 340, and a constraint field 345. The query name field 315 indicates the query received from the client 132 that is associated with the respective record.

The unexpanded partition field 320 indicates the unexpanded partitions for the query 315. An expanded partition is any partition that the query optimizer 156 dynamically optimized separately from the rest of the partitions in the table to which the query 315 was directed. An unexpanded partition is any partition that query optimizer 156 dynamically optimized together with another unexpanded partition in the table to which the query 315 was directed. In the example of FIG. 2B, the node 245 represents two unexpanded partitions of the salary table while the nodes 250 and 255 represent expanded partitions of the salary table. Likewise, in the example of FIG. 2C, the nodes 285, 290, 250, and 255 all represent expanded partitions of the salary table. A system administrator or other user may be interested in the unexpanded partitions because the system administrator may want to add non-spanning indexes to these unexpanded partitions to force expansion of the partitions during optimization, or the system administrator may want to explicitly request the query optimizer 156 to expand these partitions, in order to increase the performance of the query. A non-spanning index is an index containing a key or keys that are not present in all of the unexpanded partitions.

The estimate inaccurate field 325 indicates unexpanded partitions for which a run-time estimate for the query 315 directed to the partition was different from the actual runtime by a threshold. The user may wish to consider creating a non-spanning index for the unexpanded partitions for which the threshold was inaccurate, in order to enhance performance.

The full expansion forced field 330 indicates whether a full expansion of the partitions associated with the query 315 was forced due to a request from the client 132. The example of FIG. 2C illustrates a full expansion of all partitions.

The partition elimination field 335 indicates whether the query 315 performed partition elimination, i.e., whether the query 315 could be rewritten to eliminate partitions via a partitioned key local selection predicate. The non-spanning index field 340 indicates the partitions associated with the query 315 that have non-spanning indexes, which of theses non-spanning indexes are used by the query 315, and which of these non-spanning indexes are not used by the query 315. Expanding a partition increases optimization time. If a non-spanning index associated with the partitions used by the query 315 has been created but is not being used by the query optimizer 156, then the system administrator may wish to consider removing the index from consideration by the query optimizer 156.

The constraint field 345 indicates the constraints recommended by the query optimizer 156 that the user can add via a range partitioning request, in order to aid the query optimizer 156 in performing partition elimination. Range partitioning maps data to partitions based on ranges of partition key values that the system administrator, an other user, or program establishes for each partition via a range partitioning request. Partition elimination is a technique performed by the query optimizer 156 and the execution engine 162 to skip the accessing of unnecessary partitions, which improves performance.

In the example of FIG. 2C, the partition associated with the node 255 has constraint of salary <8, the partition associated with the node 250 has a constraint of salary >18, the partition associated with the node 285 has a constraint of 8<=salary<=12, and the partition associated with the node 290 has a constraint of 13<=salary<=18. These constraints may be established by the database management system in response to a request for range partitioning.

To understand constraints and range partitioning, consider an example query that requests records for all employees having a salary of $10 using the optimization tree 166-3 of FIG. 2C. The query optimizer 156 compares the query to the constraints of the partitions and determines that only the partition associated with node 285 is necessary (since 10 is between the constraints of 8 and 12) and that the partitions associated with the nodes 290, 250, and 255 are unnecessary. But, the query optimizer 156 cannot merely remove the nodes 290, 250, and 255 from the optimization tree 166-3 because then the optimized execution plan 154 would no longer be reusable if the query optimizer 156 receives the same query in the future, but with a different constant value, e.g., 18 instead of 10. Therefore, the query optimizer 156 puts operations in the optimization tree 166-3 that cause the execution engine 162 to check the predicate salary=10 with the constraints of a partition before processing the partition. For example, at the node 255, the execution engine 162 checks (salary=10 && salary <=8) before accessing the partition. Since this check evaluates FALSE, in this example, the execution engine 162 skips the partition associated with the node 255.

To understand the recommended constraints field 345, consider an example where all the salaries in the table are >18, and the query optimizer 156 receives queries for salary=$25. Since all salaries in the table are >18, the partitions associated with nodes 255, 285, and 290 are empty, and the execution engine 162 must access every record in the partition associated with the node 250 in order to process the queries for salary=$25. Thus, in this example, the range partitioning constraints are not yielding any performance benefit. Based on the constraints and the queries received, the query optimizer 156 determines recommended constraints that may yield better performance than the current constraints and stores the new constraints in the constraint field 345. For example, the recommended constraints of 18<salary<=25, if requested by a subsequent range partitioning request, allow the execution engine 162 to avoid processing records where salary >$25.

Figure 3B:
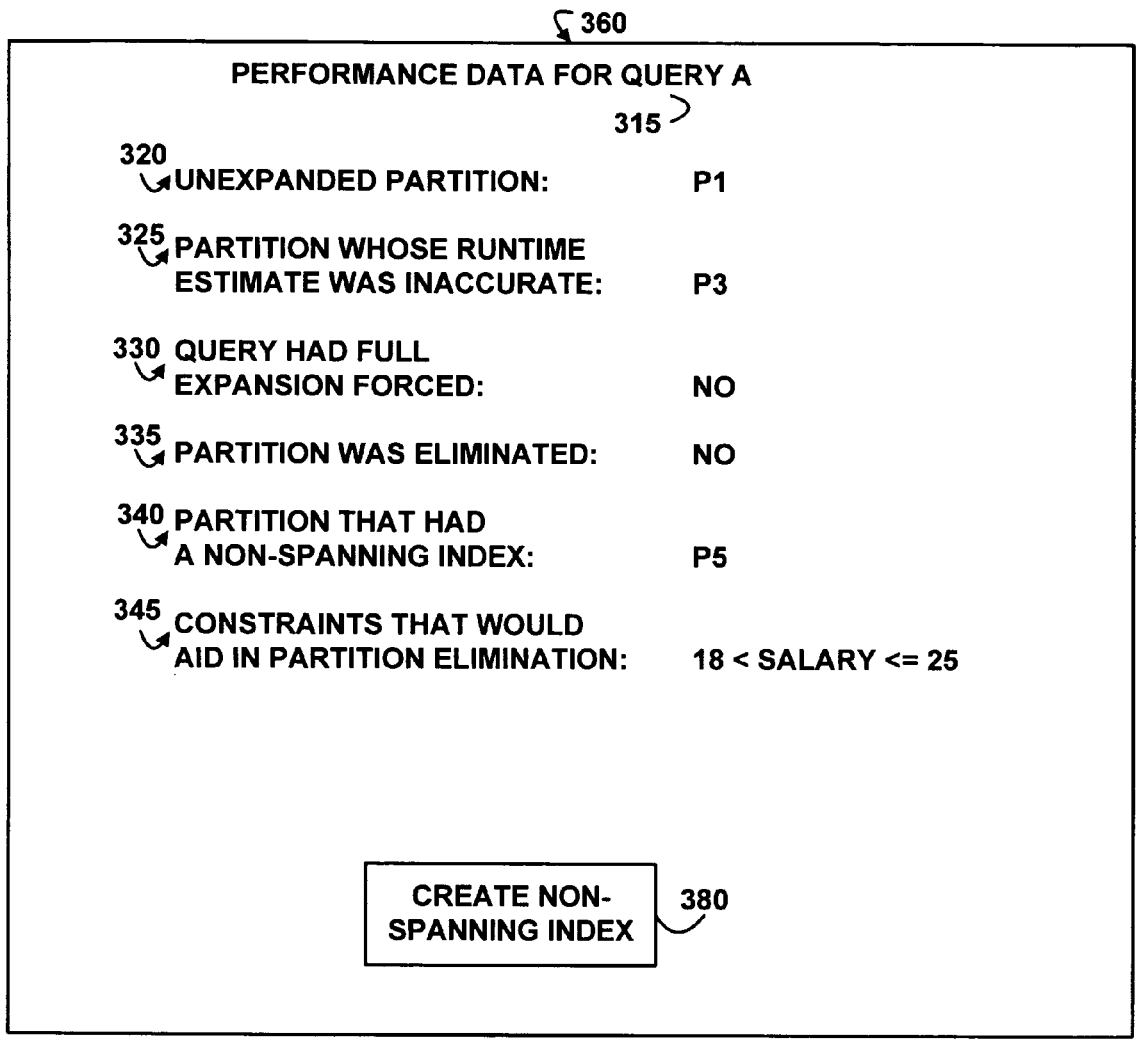
FIG. 3B depicts a block diagram of an example user interface, according to an embodiment of the invention.

FIG. 3B depicts a block diagram of an example user interface 360 for presenting the performance data 164 and providing the user with an opportunity to create a non-spanning index for any of the partitions recited in the performance data 164, according to an embodiment of the invention. The user interface 360 may be presented via any or all of the terminals 121, 122, 123, 124, or via an analogous unillustrated terminal at an electronic device connected via the network 130, e.g., the client 132.

The user interface 360 presents some or all of the contents of the fields 315, 320, 325, 330, 335, 340, 345 for at least one record in the performance data 164, as previously described above with reference to FIG. 3A. In the example of FIG. 3B, the contents of record 305 (FIG. 3A) are presented, but in other embodiments any or all of the records in the performance data 164 may be displayed. The user interface 360 also includes a button 380, which gives the user an opportunity to request the operations navigator 160 to create a non-spanning index for any selected partition presented in the user interface 360. The partitions presented in the user interface 360 are a subset of the partitions of the database table to which the query is directed, i.e., the presented partitions may be some or all of the partitions of the table. In other embodiments any appropriate user interface elements and data may be used.

Figure 4:
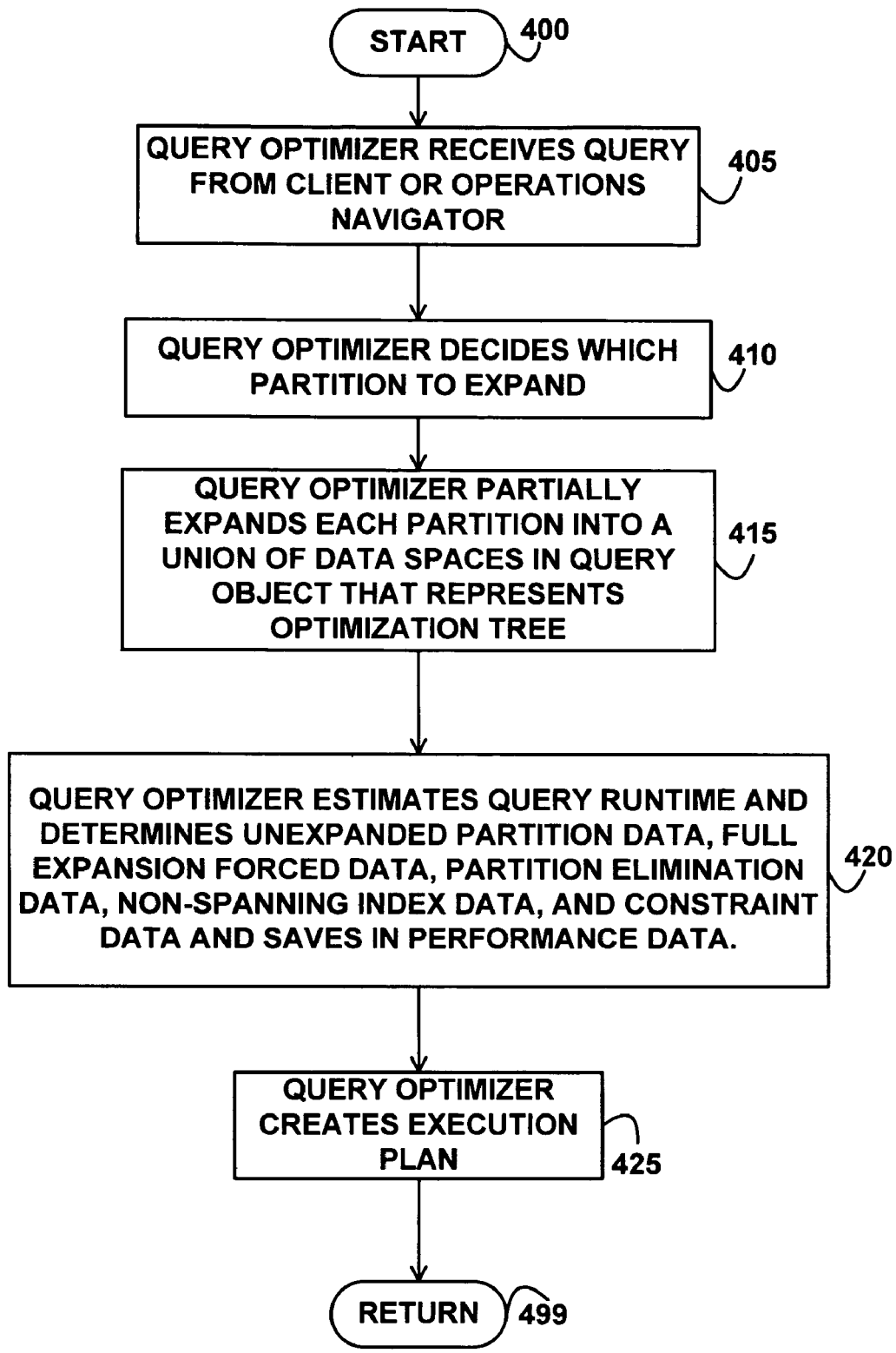
FIG. 4 depicts a flowchart of example processing for a query, according to an embodiment of the invention.

FIG. 4 depicts a flowchart of example processing for processing a query, according to an embodiment of the invention. Control begins a block 400. Control then continues to block 405 where the query optimizer 156 receives a query from the client 132 or from the operations navigator 160. Control then continues to block 410 where the query optimizer 156 decides which partition to expand based on an estimate of the time to execute the query and whether or not indexes exist that span multiple partitions. Control then continues to block 415 where the query optimizer 156 partially expands each partition into a union of data spaces in the query object 152 that represents the optimization tree 166. Control then continues to block 420 where the query optimizer 156 estimates the runtime of the query. The query optimizer further creates a record in the performance data 164, and determines the unexpanded partition data 320, the full expansion forced data 330, the partition elimination data 335, the non-spanning index data 340, and the constraint data 345, as previously described above with reference to FIG. 3A and saves them in the created record in the performance data 164. Control then continues to block 425 where the query optimizer 156 creates the execution plan 154 associated with the query. Control then continues to block 499 where the logic of FIG. 4 returns.

Figure 5:
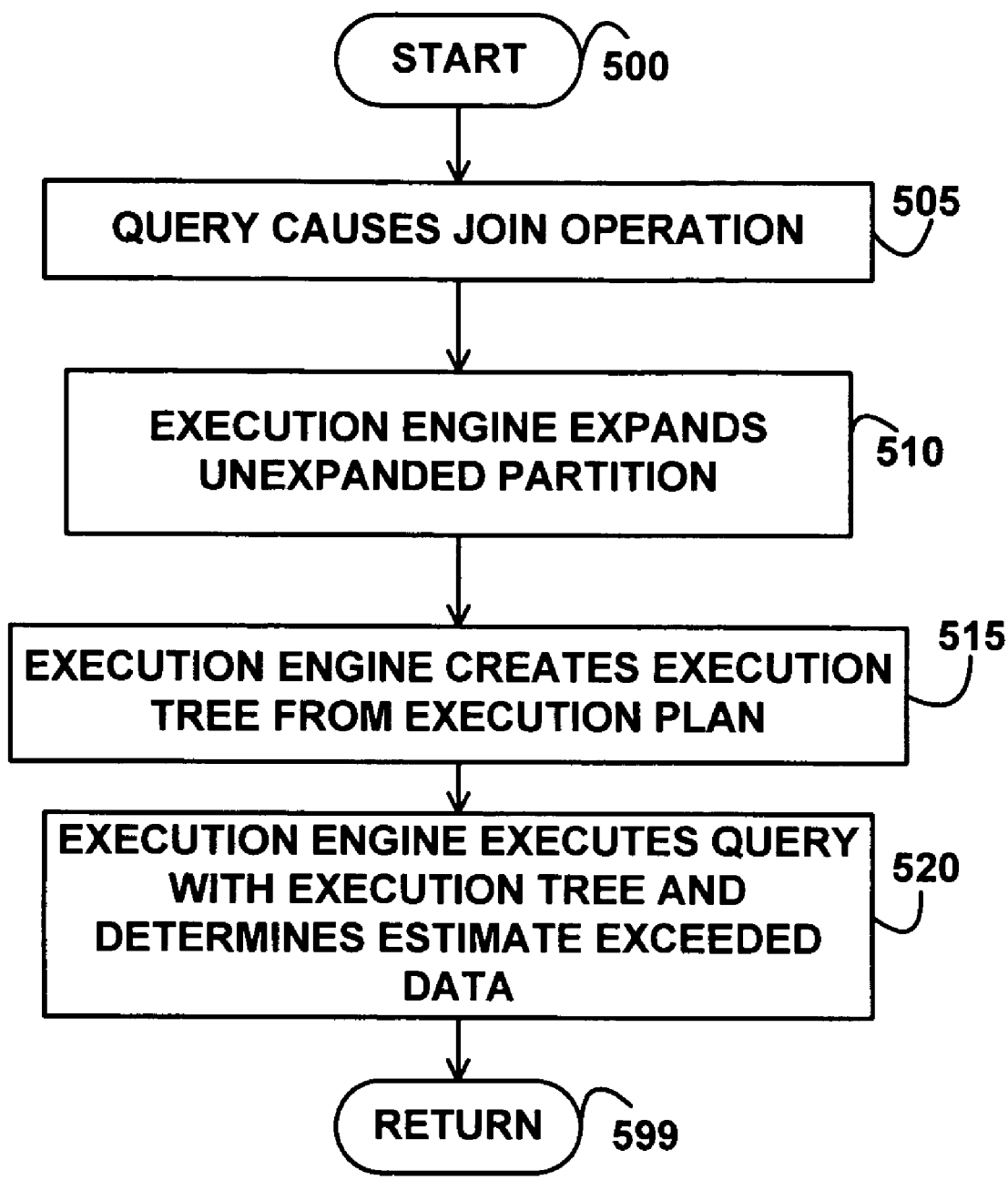
FIG. 5 depicts a flowchart of example processing for a join operation, according to an embodiment of the invention.

FIG. 5 depicts a flowchart of example processing for a join operation, according to an embodiment of the invention. Control begins at block 500. Control then continues to block 505 where a query causes a join operation. Control then continues to block 510 where the execution engine 162 expands an unexpanded partition (the unexpanded partition was not expanded by the query optimizer 156) needed by the join operation. An example of an unexpanded partition 245, which is subsequently expanded into multiple partitions 285 and 290 was previously described above with reference to FIGS. 2B and 2C. Control then continues to block 515 where the execution engine 162 creates an execution tree from the execution plan 154. Control then continues to block 520 where the execution engine 162 executes the query with the execution tree, including determining the estimate inaccurate data 325 and saving it in the record associated with the query in the performance data 164. A runtime event is triggered during execution time that causes the execution engine 162 to determine whether the estimated query runtime created by the query optimizer 156 was different from the actual runtime of the query by a threshold (either higher or lower), on a partition basis. The execution engine 162 saves the identifiers of the partitions whose query estimates were different by a threshold from the actual runtime of the query in the estimate inaccurate field 325 in the record associated with the query.

Control then continues to block 599 where the logic of FIG. 5 returns.

Figure 6:
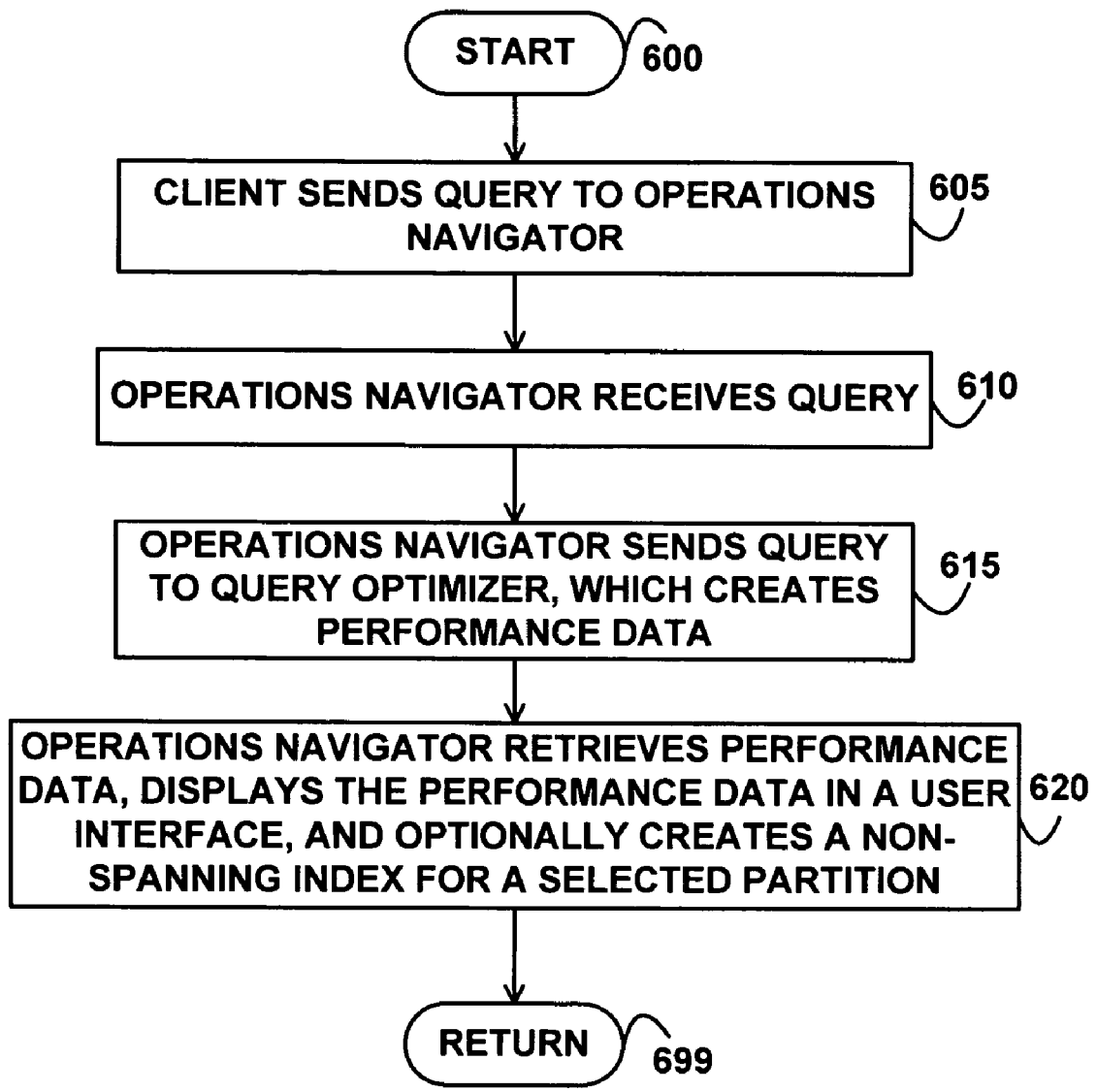
FIG. 6 depicts a flowchart of example processing for retrieving performance data in response to a query operation, according to an embodiment of the invention.

FIG. 6 depicts a flowchart of example processing for retrieving performance data in response to a query operation, according to an embodiment of the invention. Control begins at block 600. Control then continues to block 605 where the client 132 sends a query to the operations navigator 160. Control then continues to block 610 where the operations navigator 160 receives the query. Control then continues to block 615 where the operations navigator 167 sends the query to the query optimizer 156, which creates the performance data 164, as previously described above with reference to block 620. Control then continues to block 620 where the operations navigator 160 retrieves the performance data 164 and displays the performance data 164 (FIG. 3A) in a user interface (FIG. 3B), as previously described above. The operations navigator 160 further creates a non-spanning index for any partition selected by the user, as previously described above with reference to FIG. 3B. Control then continues to block 699 where the logic of FIG. 6 returns.

Figure 7:
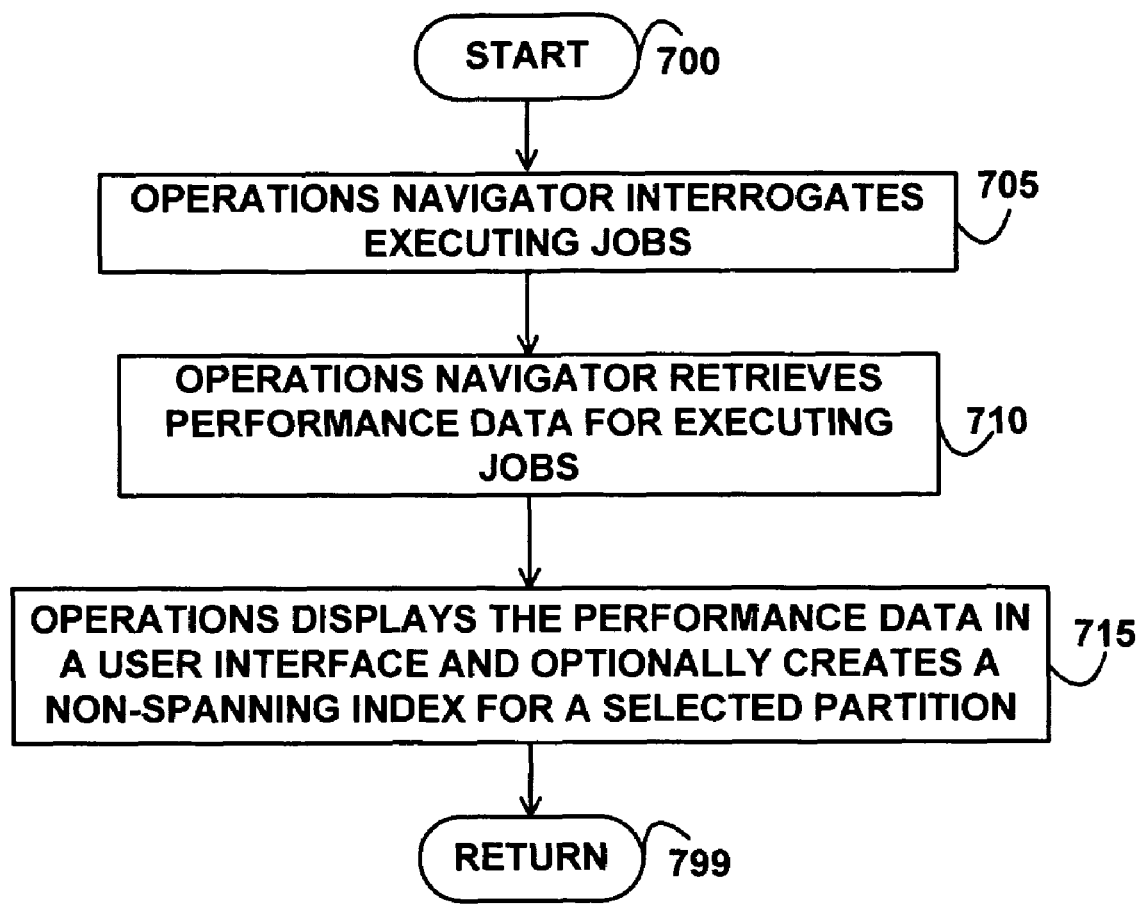
FIG. 7 depicts a flowchart of example processing for retrieving performance data in response to the execution of jobs, according to an embodiment of the invention.

FIG. 7 depicts a flowchart of example processing for retrieving the performance 164 data in response to the execution of jobs, according to an embodiment of the invention. Control begins at block 700. The control then continues to block 705 where the operations navigator 160 interrogates jobs that are executing in the computer system 100. Control then continues to block 710 where the operations navigator 160 retrieves the performance data 164 associated with the queries performed by the executing jobs. Control then continues to block 715 where the operations navigator 160 displays the performance data 164 (FIG. 3A) in the user interface (FIG. 3B), as previously described above. The operations navigator 160 further creates a non-spanning index for any partition selected by the user, as previously described above with reference to FIG. 3B. Control then continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    determining performance data for query optimization of a query directed to a database table comprising a plurality of partitions wherein the determining further comprises determining whether the query performed partition elimination;
    presenting the performance data for the query optimization in a user interface, wherein the performance data comprises information regarding a subset of the plurality of partitions;
    presenting an option in the user interface to create a non-spanning index for any partition in the subset that is unexpanded, wherein the non-spanning index comprises a key that is not present in all of the plurality of partitions that are unexpanded, wherein the plurality of partitions that are unexpanded are not represented in an optimization tree that represents a join operation of a plurality of tables, wherein the query optimizer optimizes the plurality of partitions that are expanded separately from all other of the plurality of partitions, wherein the query optimizer optimizes the plurality of partitions that are unexpanded together, wherein the non-spanning index forces the query optimizer to expand the partition in the subset that is unexpanded during optimization of the query; and
    presenting a recommendation in the user interface to add a range partitioning constraint to one of the plurality of partitions, wherein the range partitioning constraint maps data to the plurality of partitions based on ranges of partition key values.

2. The method of claim 1, wherein the determining further comprises:
    determining whether any of the plurality of partitions was unexpanded by the query optimization.

3. The method of claim 1, wherein the determining further comprises:
    determining whether any of the plurality of partitions had a runtime estimate that was different from an actual query runtime by a threshold.

4. The method of claim 1, wherein the determining further comprises:
    determining whether any of the plurality of partitions had expansion forced by a client request.

5. The method of claim 1, wherein the determining further comprises:
    determining whether any of the plurality of partitions has an associated index that is unused by the query and that also has the key that is not present in all of the plurality of partitions.

6. The method of claim 1, wherein the determining further comprises:
    determining a constraint for the partition elimination.

7. A method for configuring a computer, comprising:
    configuring the computer to determine performance data for query optimization of a query directed to a database table comprising a plurality of partitions, wherein the configuring the computer to determine further comprises configuring the computer to determine whether the query performed partition elimination;
    configuring the computer to present the performance data for the query optimization in a user interface, wherein the performance data comprises information regarding a subset of the plurality of partitions;
    configuring the computer to present an option in the user interface to create a non-spanning index for any partition in the subset that is unexpanded, wherein the non-spanning index comprises a key that is not present in all of the plurality of partitions that are unexpanded, wherein the plurality of partitions that are unexpanded are not represented in an optimization tree that represents a join operation of a plurality of tables, wherein a query optimizer optimizes the plurality of partitions that are expanded separately from all other of the plurality of partitions, wherein the query optimizer optimizes the plurality of partitions that are unexpanded together, wherein the non-spanning index forces the query optimizer to expand the partition in the subset that is unexpanded during optimization of the query; and
    presenting a recommendation in the user interface to add a range partitioning constraint to one of the plurality of partitions, wherein the range partitioning constraint maps data to the plurality of partitions based on ranges of partition key values.

8. The method of claim 7, wherein the configuring the computer to determine further comprises:
    configuring the computer to determine whether any of the plurality of partitions was unexpanded by the query optimization.

9. The method of claim 7, wherein the configuring the computer to determine further comprises:
    configuring the computer to determine whether any of the plurality of partitions had a runtime estimate that was different from an actual query runtime by a threshold.

10. The method of claim 7, wherein the configuring the computer to determine further comprises:
    configuring the computer to determine whether any of the plurality of partitions had expansion forced by a client request.

11. The method of claim 7, wherein the configuring the computer to determine further comprises:
    configuring the computer to determine whether any of the plurality of partitions has an associated index that is unused by the query and that also has the key that is not present in all of the plurality of partitions; and
    configuring the computer to determine a constraint for the partition elimination.

* * * * *